United States Patent
Suman et al.

(10) Patent No.: US 11,030,395 B2
(45) Date of Patent: Jun. 8, 2021

(54) TOP-ALIGN COMMENTS: JUST-IN-TIME HIGHLIGHTS AND AUTOMATIC SCROLLING

(71) Applicant: Microsoft Technology Licensing, LLC, Redmond, WA (US)

(72) Inventors: Apurv Suman, Seattle, WA (US); Dheeraj Agarwal, Hyderabad (IN); Nicholas Michael Simons, Redmond, WA (US); Sneha Jayaprakash, Kirkland, WA (US); Sophia Isabel Vennix, Seattle, WA (US); Kathleen Anna Cachel, Cambridge, MA (US); Derik Bjorn Stenerson, Redmond, WA (US); Michael Augustine Tavis, Boston, MA (US); Robin Emily Wakefield, Seattle, WA (US); Daniel John Niezgocki Chattan, Rowley, MA (US); Harold Sazon Gomez, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/993,459

(22) Filed: May 30, 2018

(65) Prior Publication Data
US 2019/0370319 A1 Dec. 5, 2019

(51) Int. Cl.
*G06F 40/169* (2020.01)
*G06F 3/0484* (2013.01)
*G06F 3/0485* (2013.01)

(52) U.S. Cl.
CPC .......... *G06F 40/169* (2020.01); *G06F 3/0485* (2013.01); *G06F 3/04842* (2013.01)

(58) Field of Classification Search
CPC ... G06F 17/241; G06F 3/0485; G06F 3/04842
See application file for complete search history.

(56) References Cited

U.S. PATENT DOCUMENTS

| 7,735,101 B2* | 6/2010 | Lanza | H04N 21/4756 725/32 |
| 8,862,591 B2* | 10/2014 | Chowdhury | G06F 3/0482 707/748 |

(Continued)

OTHER PUBLICATIONS

"kapost: Document Annotations", Retrieved from: https://help.kapost.com/hc/en-us/articles/231719247-Document-Annotations, Retrieved Date: Apr. 27, 2018, 6 Pages.

(Continued)

*Primary Examiner* — Scott T Baderman
*Assistant Examiner* — Mario M Velez-Lopez
(74) *Attorney, Agent, or Firm* — Rainier Patents, P.S.

(57) ABSTRACT

Described herein is a system and method for displaying annotation(s) of an electronic document. User input to review (e.g., scroll) the electronic document is received, until a selected portion of the electronic document is displayed within a viewport pane of a display. In response to the review input, annotation(s) (e.g., comment(s), comment thread(s), annotation thread(s)) anchored within the selected portion of the electronic document displayed within the viewport pane are identified. Which annotation of the annotation(s) to visually distinguish for a focus of the user is determined. The identified annotation(s) are displayed in an annotation pane, with the determined annotation visually distinguished (highlighted) for the focus of the user. In some embodiments, the anchor associated with the determined annotation is also visually distinguished to provide a contextual link to the user and/or hint(s) that provided a visual signal of annotation(s) associated with an anchor on a particular line are displayed.

20 Claims, 8 Drawing Sheets

(56) References Cited

U.S. PATENT DOCUMENTS

| | | | | |
|---|---|---|---|---|
| 9,471,559 B2* | 10/2016 | Castelli | ............... | G06F 40/211 |
| 10,402,486 B2* | 9/2019 | Kerr | ............... | G06F 40/151 |
| 2004/0194021 A1* | 9/2004 | Marshall | ............... | G06F 40/169 |
| | | | | 715/232 |
| 2006/0053364 A1* | 3/2006 | Hollander | ............... | G06F 16/954 |
| | | | | 715/232 |
| 2007/0055926 A1* | 3/2007 | Christiansen | ......... | G06F 17/241 |
| | | | | 715/210 |
| 2010/0095211 A1* | 4/2010 | Kenvin | ............... | G11B 27/034 |
| | | | | 715/723 |
| 2010/0251165 A1* | 9/2010 | Williams | ............... | G06F 3/0482 |
| | | | | 715/784 |
| 2010/0278453 A1* | 11/2010 | King | ............... | G06Q 10/10 |
| | | | | 382/321 |
| 2011/0022940 A1* | 1/2011 | King | ............... | G06F 16/9554 |
| | | | | 715/229 |
| 2011/0289401 A1* | 11/2011 | Fischer | ............... | G06F 17/211 |
| | | | | 715/232 |
| 2012/0036423 A1 | 2/2012 | Haynes et al. | | |
| 2012/0060082 A1 | 3/2012 | Edala et al. | | |
| 2013/0191720 A1* | 7/2013 | Simons | ............... | G06F 17/2247 |
| | | | | 715/234 |
| 2013/0262373 A1 | 10/2013 | Rampson | | |
| 2014/0172456 A1* | 6/2014 | Qian | ............... | G06F 16/248 |
| | | | | 705/3 |
| 2015/0109304 A1* | 4/2015 | Isokawa | ............... | A61B 6/461 |
| | | | | 345/427 |
| 2015/0135097 A1* | 5/2015 | Carriero | ............... | G06F 9/54 |
| | | | | 715/753 |
| 2017/0142044 A1* | 5/2017 | Ball | ............... | G06F 16/23 |
| 2017/0286416 A1 | 10/2017 | Gan et al. | | |
| 2018/0121039 A1 | 5/2018 | Bliss et al. | | |
| 2018/0150450 A1* | 5/2018 | Wei | ............... | G06F 17/241 |
| 2019/0332687 A1* | 10/2019 | Wilf | ............... | G06F 40/106 |
| 2020/0293712 A1* | 9/2020 | Potts | ............... | G16H 10/60 |

OTHER PUBLICATIONS

"Reviewing Pane", Retrieved from: https://documentation.devexpress.com/WPF/118664/Controls-and-Libraries/Rich-Text-Editor/Visual-Elements/Rich-Edit-Control/Reviewing-Pane, Retrieved Date: Apr. 27, 2018, 3 Pages.

"Ulysses: Comments, Annotations, Notes", Retrieved from: https://ulyssesapp.com/tutorials/comments, Retrieved Date: Apr. 27, 2018, 6 Pages.

Cook, Ivan, "Top 15 PDF Annotator Software to Annotate, Comment and Handwrite Your PDF Files", Retrieved from: https://pdf.iskysoft.com/pdf-editor/pdf-annotator.html, Aug. 30, 2017, 8 Pages.

Hou, et al., "Learning to Align Comments to News Topics", In Journal of ACM Transactions on Information Systems, vol. 36, Issue 1, Jul. 2017, 31 Pages.

Randall, Neil, "Customizing Comments and Revisions Tracking in Microsoft Word", Retrieved from: https://www.pcmag.com/article2/0,2817,2331926,00.asp, Oct. 7, 2008, 5 Pages.

"International Search Report and Written Opinion Issued in PCT Application No. PCT/US2019/032329", dated Jul. 18, 2019, 10 Pages.

* cited by examiner

TOP-ALIGN COMMENTS: JUST-IN-TIME HIGHLIGHTS AND AUTOMATIC SCROLLING

BACKGROUND

Word processing, spreadsheet, database, slide presentation, electronic mail, drawing, note taking, web browser, media player, and game applications allow users to view, create, and/or edit electronic documents. The use of comments in electronic documents has evolved in recent years from insertion of individual comments to the use of comment threads in a collaborative setting.

SUMMARY

Described herein is a system for displaying one or more comments of an electronic document, comprising: a computer comprising a processor and a memory having computer-executable instructions stored thereupon which, when executed by the processor, cause the computer to: receive input from a user to review an electronic document until a selected portion of the electronic document is displayed within a viewport pane of a display; in response to the review input, identify one or more annotations that are anchored within the selected portion of the electronic document displayed within the viewport pane; determine which annotation of the one or more annotations to visually distinguish for a focus of the user; and display in an annotation pane the identified one or more annotations that are anchored within the selected portion of the electronic document displayed within the viewport pane with the determined annotation visually distinguished for the focus of the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
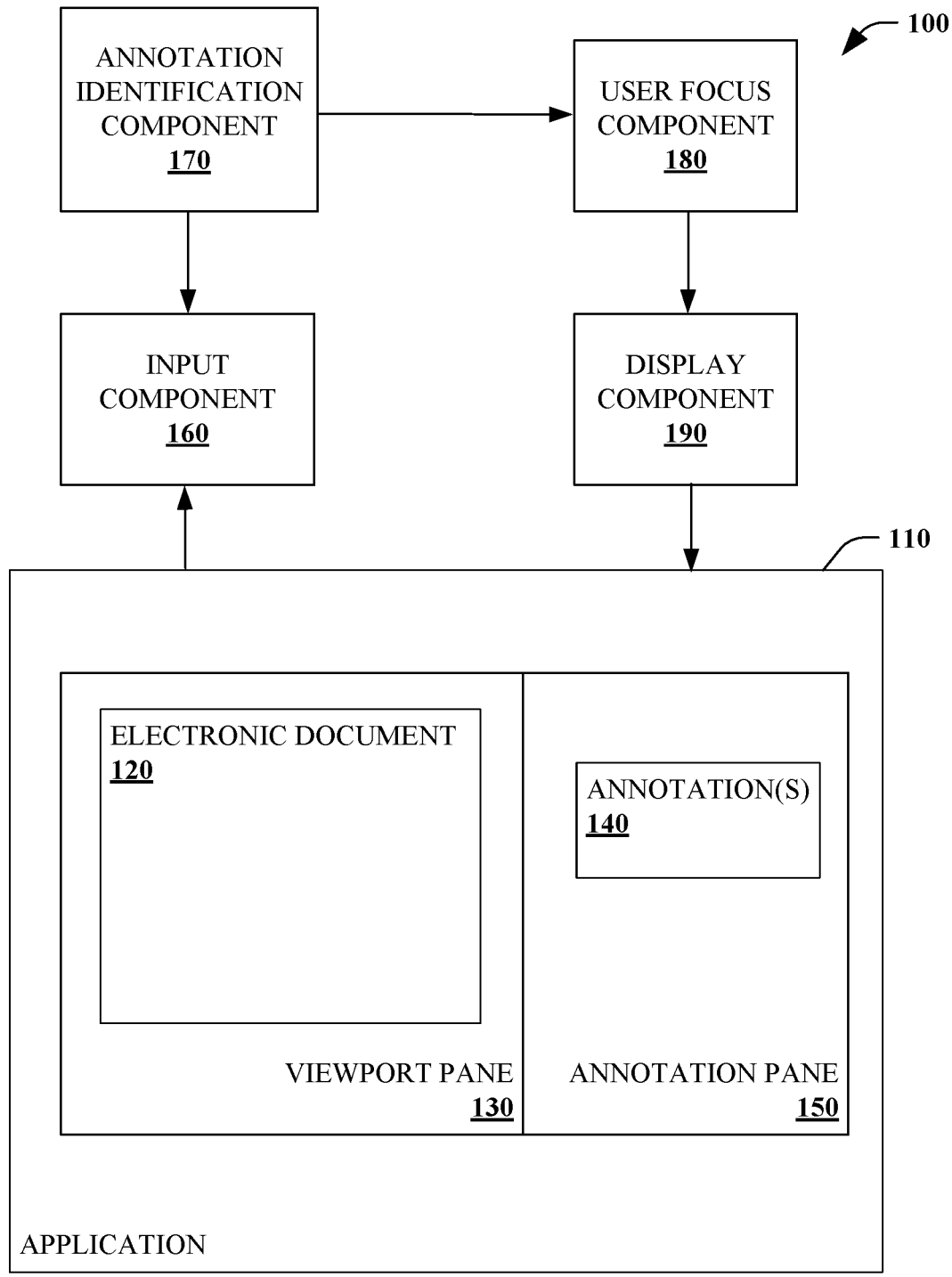
FIG. 1 is a functional block diagram that illustrates a system for displaying one or more annotations of an electronic document.

Various technologies pertaining to visually distinguishing annotation(s) (e.g., comment(s), mark-up) in electronic documents are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding visually distinguishing annotation(s) in electronic documents. What follows are one or more exemplary systems and methods.

Aspects of the subject disclosure pertain to the technical problem of visually distinguishing annotation(s) in electronic documents. The technical features associated with addressing this problem involve receiving input from a user to review (e.g., scroll) an electronic document until a selected portion of the electronic document is displayed within a viewport pane of a display; in response to the review input, identifying one or more annotations that are anchored within the selected portion of the electronic document displayed within the viewport pane; determining which annotation of the one or more annotations to visually distinguish for a focus of the user; and displaying in an annotation pane the identified one or more annotations that are anchored within the selected portion of the electronic document displayed within the viewport pane with the determined annotation visually distinguished for the focus of the user. Accordingly, aspects of these technical features exhibit technical effects of more efficiently and effectively efficiently and effectively visually distinguishing annotation(s) (e.g., comment(s), mark-up) in electronic documents thus reducing computer resource(s) and/or increasing user satisfaction.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Conventionally, annotations such as comments which were inserted into electronic documents were viewable in an inflexible manner. Annotations were generally tightly coupled to their respective anchor within the electronic document. This presented problems in situations where many annotations (e.g., comments) were present, several annotations (e.g., comments) were near each other, and/or knowing the entire list of annotations (e.g., comments) was difficult. Some applications allowed for a list of annotations (e.g., comments and/or markup) to be separately viewable. However, this lost the fidelity and precision of knowing which annotation went with which anchor (without taking explicit action to do so).

Described herein are systems and methods in which annotation(s) (e.g., comment(s), mark-up) are displayed in a more intelligent, user-focused manner in which annotation(s) (e.g., annotation(s) such as mark-up, annotation thread(s), comment(s), comment thread(s)) that are anchored within a selected portion of an electronic document displayed within a current viewport pane are displayed in an annotation pane (e.g., separately reviewable/scrollable), with particular annotation(s) visually distinguished for focus of a user.

In some embodiments, the particular annotation(s) can be visually distinguished by highlighting (e.g., at least a portion of the particular annotation(s)) in one or more colors (e.g., user-configurable hierarchy). In some embodiments, the determination of the particular annotation(s) to be visually distinguished can be based upon physical location of an associated anchor within the current viewport, temporal information (e.g., most recently modified annotation), using a machine learning algorithm (e.g., evaluating content, semantic, and/or context information of at least a portion of the electronic document, anchor, annotation, and/or annotation thread). By visually distinguishing the particular annotation(s), the user experience can be favorably enhanced.

Referring to FIG. 1, a system for displaying one or more annotations of an electronic document 100 is illustrated. The system 100 includes an application 110 used to view, generate, and/or edit an electronic document 120. Examples of suitable applications 110 include, but are not limited to, word processing, spreadsheet, database, slide presentation, electronic mail, drawing, note taking, web browser, media player, and game applications.

In some embodiments, the system 100 can facilitate displaying annotation(s) in a more intelligent, user-focused manner in which annotation(s) 140 that are anchored within a selected portion of the electronic document 120 displayed within a current viewport 130 are displayed in an annotation pane 150, with particular annotation(s) 140 visually distinguished for focus of a user. In some embodiments, the particular annotation(s) 140 can be visually distinguished by highlighting in one or more colors (e.g., user-configurable hierarchy).

The system 100 includes an input component 160 that receives input from a user to review (e.g., open, scroll) the electronic document 120 of a document canvas of the application 110 until a selected portion of the electronic document 120 is displayed within the viewport pane 130 of a display.

The system 100 further includes an annotation identification component 170 that, in response to the review input, identifies one or more annotations 140 that are anchored within the selected portion of the electronic document 120 displayed within the viewport pane 130. By way of explanation and not limitation, an anchor can comprise a point, an alphanumeric character, a word (or portion thereof), a sentence (or portion thereof), a paragraph (or portion thereof), a section (or portion thereof), digital ink, an image, a table, a cell, a chart, an embedded object, and/or an entirety of the electronic document 120.

The system 100 includes a user focus component 180 that determines which annotation 140 of the one or more annotations 140 to visually distinguish for a focus of the user. In some embodiments, the user focus component 180 identifies only one of a plurality of annotations 140 to visually distinguish. In some embodiments, the user focus component 180 identifies a quantity of annotations 140 (e.g., user-configurable) to visually distinguish.

In some embodiments, the user focus component 180 identifies a first anchor in a flow of text of the electronic document 120 displayed within the viewport pane 130 and determines an annotation 140 associated with the first anchor as the annotation 140 to visually distinguish. In some embodiments, the user focus component 180 identifies a top anchor of content (e.g., text) of the electronic document 120 displayed within the viewport pane 130 and determines an annotation 140 associated with the top anchor as the annotation 140 to visually distinguish.

In some embodiments, the user focus component 180 determines a most recently modified annotation 140 as the annotation to visually distinguish. In some embodiments, the user focus component 180 determines an annotation 140 associated with the user and/or other user(s) (e.g., @mention) to visually distinguish.

In some embodiments, the user focus component 180 utilizes a machine learning algorithm to determine most significant annotation(s) 140 to visually distinguish. For example, the user focus component 180 can utilize a model trained using a machine learning process that takes utilizes various features present in electronic documents and associated annotations (e.g., comment threads) with the model representing an association among the features. In some embodiments, the model is trained using one or more machine learning algorithms including linear regression algorithms, logistic regression algorithms, decision tree algorithms, support vector machine (SVM) algorithms, Naive Bayes algorithms, a K-nearest neighbors (KNN) algorithm, a K-means algorithm, a random forest algorithm, dimensionality reduction algorithms, Artificial Neural Network (ANN) and/or a Gradient Boost & Adaboost algorithm. The model can be trained in a supervised, semi-supervised and/or unsupervised manner. Once trained, the model can be utilized by the user focus component 180 to determine the most significant annotation(s) to visually distinguish.

The system 100 further includes a display component 190 that displays, in the annotation pane 150, the identified one or more annotations 140 that are anchored within the selected portion of the electronic document 120 displayed within the viewport pane 130, with the determined annotation(s) 140 visually distinguished for the focus of the user. In some embodiments, the determined annotation(s) 140 are visually distinguished by highlighting of the determined annotation(s) 140 and an anchor associated with the determined annotation(s) 140 to provide a contextual link to the user. In some embodiments, the determined annotation(s) 140 and the anchor associated with the determined annotation(s) are highlighted in a same particular color. In some embodiments, each of a plurality of determined annotations and its anchor associated are highlighted in a same particular color, with a particular color selected for each of the plurality of determined annotations (e.g., each determined annotation/anchor pair have its own, different highlighted color).

In some embodiments, the determined annotations 140 can be visually distinguished by highlighting in a plurality of colors (e.g., user-configurable hierarchy). For example, a particular color can be chosen for based upon a review of the content of the particular annotation 140 and/or metadata (e.g., author(s) of annotation(s), time/date of annotation(s)) associated with the particular annotation 140.

In some embodiments, a particular color of highlighting can be associated with a role of author(s) of annotation(s) using a highlighting scheme (e.g., user-configurable). For example, annotation(s) (e.g., comment(s)) authored by the user's manager or other(s) higher in the organization's hierarchy can be indicated with a particular color to visually distinguish these comment(s) for focus of the user.

In some embodiments, the annotation pane 150 is separately reviewable (e.g., scrollable) from the viewport pane 130. In some embodiments, the input component 160 can receive input from the user to review (e.g., scroll) the annotation pane 150 until a particular annotation is displayed within the annotation pane 150. In response to the user input to review (e.g., scroll) the annotation pane 150, a portion of the electronic document comprising an anchor associated with the particular annotation is displayed in the viewport pane 130.

Figure 2:
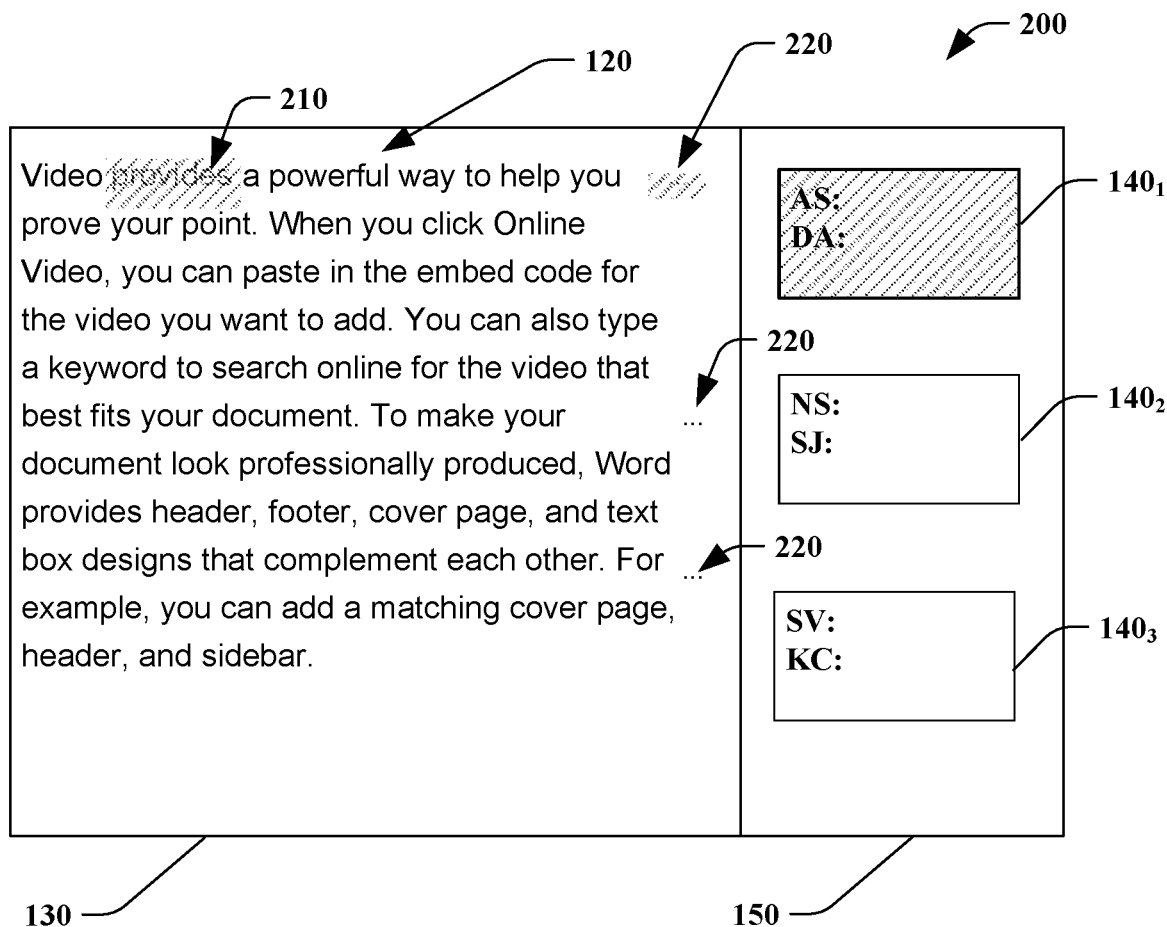
FIGS. 2-4 are exemplary user interfaces.

FIG. 2 illustrates an exemplary user interface 200 generated by the application 110 in accordance with information provided by the system 100. In response to user input to review (e.g., open, scroll) an electronic document 120, a selected portion of the electronic document 120 is displayed with a viewport pane 130 of the user interface 200. In response to the review input, the system 100 has identified three annotations $140_1$, $140_2$, $140_3$ that are anchored within the selected portion of the electronic document 120 displayed within the viewport pane 130. In this example, each of the annotations $140_1$, $140_2$, $140_3$ comprises one or more comments of a particular comment thread.

By way of explanation and not limitation, the system 100 has identified and determined a first anchor in a flow of text of the electronic document 120 displayed within the viewport pane 130 and determined the annotation $140_1$ associated with the first anchor 210 as the annotation 140 to visually distinguish in the user interface 200. In this example, the anchor 210 ("provides") and corresponding annotation $140_1$ are visually distinguished in a similar manner (e.g., diagonal lines) to provide a visual contextual link to the user. In some embodiments, the entire determined annotation $140_1$ is visually distinguished (e.g., highlighted). In some embodiments, a perimeter of the determined annotation $140_1$ is visually distinguished (e.g., highlighted).

In some embodiments, the viewport pane 130 can further include one or more hints 220 which provide a visual signal to the user that one or more annotations 140 are associated with an anchor on the particular line. In the exemplary user interface 200, an ellipse is used as the hint 220. In some embodiments, the hint 220 is a predetermined symbol (e.g., ellipse). In some embodiments, the hint 220 can be user-configurable. In some embodiments, the hint 220 associated with determined annotation $140_1$, the anchor 210 ("provides") associated with the determined annotation $140_1$ and the determined annotation $140_1$ are visually distinguished in a similar manner (e.g., diagonal lines) to provide a visual contextual link to the user.

In some embodiments, the hint 210 can be one of a plurality of character(s), symbol(s), and/or sequence(s) of character(s) and/or symbol(s), with each particular character(s), symbol(s), and/or sequence(s) of character(s) and/or symbol(s) being associated with particular anchor content and/or annotation content. For example, a particular character or sequence of characters (e.g., "*") can signal an annotation 140 authored and/or modified by a particular user and/or a user with a particular role.

Figure 3:
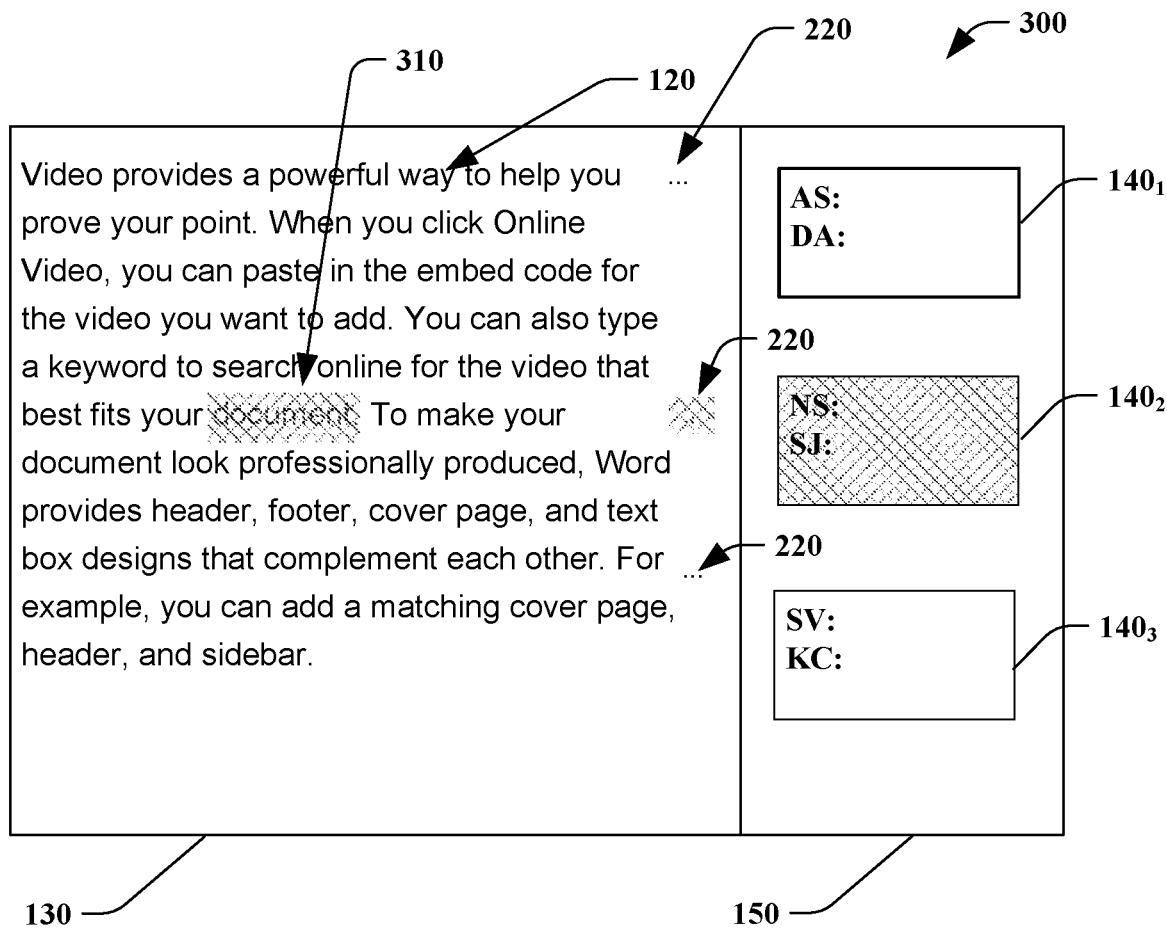

FIG. 3 illustrates an exemplary user interface 300 generated by the application 110 in accordance with information provided by the system 100. In response to user input to review (e.g., open, scroll) an electronic document 120, a selected portion of the electronic document 120 is displayed with a viewport pane 130 of the user interface 200. In response to the review input, the system 100 has identified three annotations $140_1$, $140_2$, $140_3$ that are anchored within the selected portion of the electronic document 120 displayed within the viewport pane 130. In this example, each of the annotations $140_1$, $140_2$, $140_3$ comprises one or more comments of a particular comment thread.

By way of explanation and not limitation, the system 100 has identified and determined a most recently modified annotation $140_2$ to visually distinguish in the user interface 200. In this example, the hint 220 associated with determined annotation $140_2$, the anchor 310 ("document") and corresponding annotation $140_2$ are visually distinguished in a similar manner (e.g., crosshatching) to provide a visual contextual link to the user.

Figure 4:
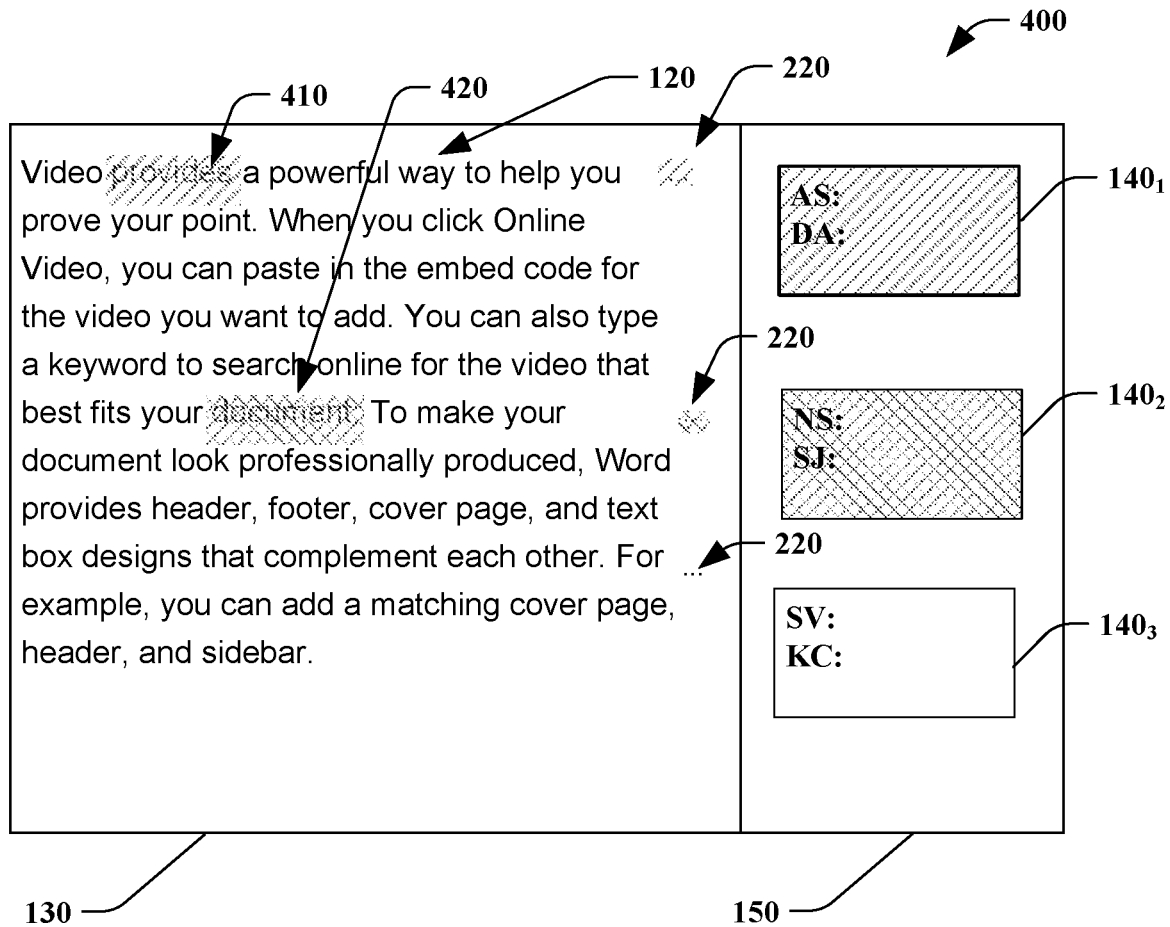

FIG. 4 illustrates an exemplary user interface 400 generated by the application 110 in accordance with information provided by the system 100. In response to user input to review an electronic document 120, a selected portion of the electronic document 120 is displayed with a viewport pane 130 of the user interface 200. In response to the review input, the system 100 has identified three annotations $140_1$, $140_2$, $140_3$ that are anchored within the selected portion of the electronic document 120 displayed within the viewport pane 130. In this example, each of the annotations $140_1$, $140_2$, $140_3$ comprises one or more comments of a particular comment thread.

By way of explanation and not limitation, the system 100 has identified and determined annotation $140_1$ and annotation $140_2$ to visually distinguish in the user interface 200. In this example, the hint 220 associated with determined annotation $140_1$, a first anchor 410 ("provides") and corresponding annotation $140_1$ are visually distinguished in a similar manner (e.g., diagonal lines) to provide a visual contextual link to the user. Additionally, the hint associated with determined annotation $140_2$, a second anchor 420 ("document") and corresponding annotation $140_2$ are visually distinguished in a similar manner (e.g., crosshatching) to provide a visual contextual link to the user.

Figure 5:
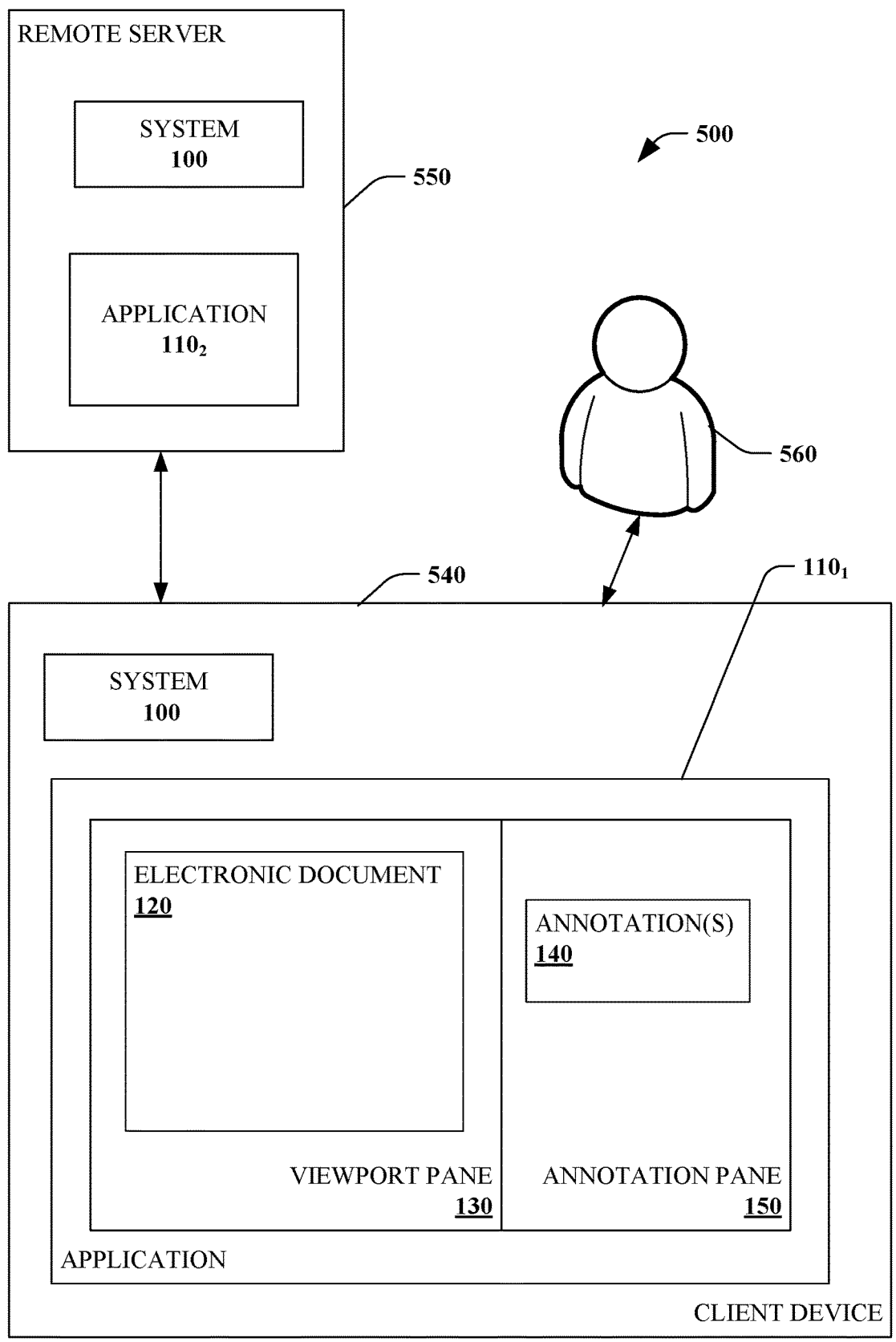
FIG. 5 is a functional block diagram that illustrates another system for displaying one or more annotations of an electronic document.

Turning to FIG. 5, a system for displaying one or more comments of an electronic document 500 is illustrated. The system 500 includes an application $510_1$, $510_2$ (generally, 510) used to view, generate, and/or edit an electronic document 520 (e.g., electronic file). Examples of suitable applications 510 include, but are not limited to, word processing, spreadsheet, database, slide presentation, electronic mail, drawing, note taking, web browser, media player, and game applications.

In some embodiments, the application $510_1$ is a thick client application stored locally on a client device 540. In some embodiments, the application $510_2$ is thin client application (i.e., web applications) that resides on a remote service 550 and accessible over a network or combination of networks (e.g., the Internet, wide area networks, local area networks). A thin client application $510_2$ can be hosted in a browser-controlled environment or coded in a browser-supported language and reliant on a common web browser to render the application executable on the client device 540.

A user 560 can use the application 510 to create a new document 520, edit an existing document 520, and/or view an existing document 520. The application 510 receives input from the user 560, for example, text input, from one or more input devices including, for example, a keyboard, a computer mouse, a remote control, an electronic pen. In some embodiments, the application 510 receives input from the user 560 through a Natural User Interface (NUI) which enables the user to interact with the client device 540 in a natural manner. Examples of NUI include speech recognition, touch and stylus recognition, gesture recognition both on screen and adjacent to the screen, air gestures, head and eye tracking, voice and speech, vision, touch, hover, gestures, machine intelligence, and the like.

User review input (e.g., open, scroll) results in a selected portion of the electronic document 120 being displayed within a viewport pane 130 of a display. In response to the review input, one or more annotations 140 that are anchored within the selected portion of the electronic document 120 displayed within the viewport pane 130 are identified by the system 100 with each annotation 140 comprising one or more comments of a comment thread. Which annotation 140 of the one or more annotations 140 to visually distinguish for a focus of the user is determined by the system 100. An annotation pane 150 displays the identified one or more annotations 140 that are anchored within the selected portion of the electronic document 120 displayed within the viewport pane 130, with the determined annotation 140 visually distinguished for the focus of the user.

The system 500 can include the system 100. In some embodiments, the system 100 executes on the remote server 550. In some embodiments, the system 100 executes on the client device 540.

Figure 6:
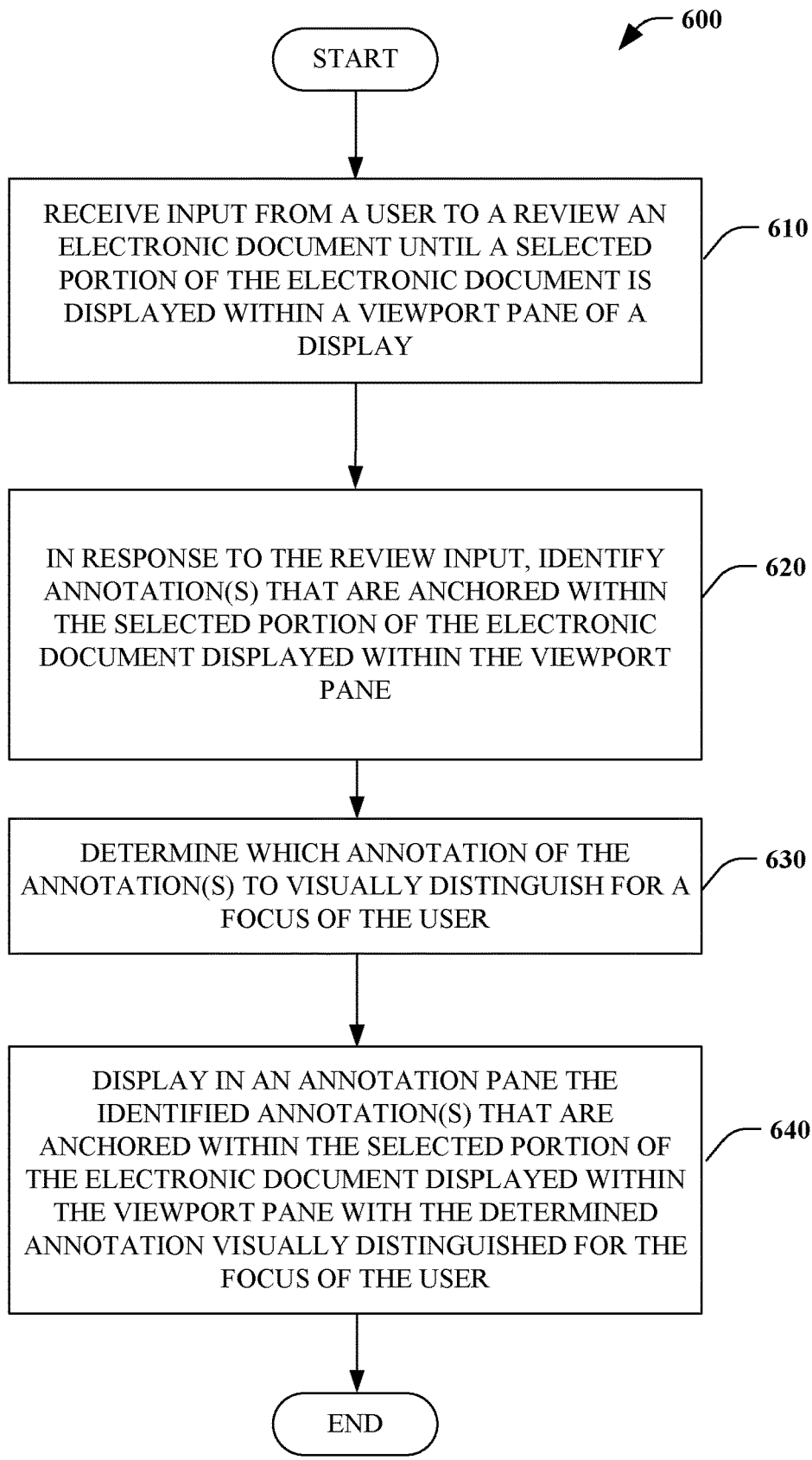
FIG. 6 is a flow chart that illustrates a method of displaying one or more annotations of an electronic document.
Figure 7:
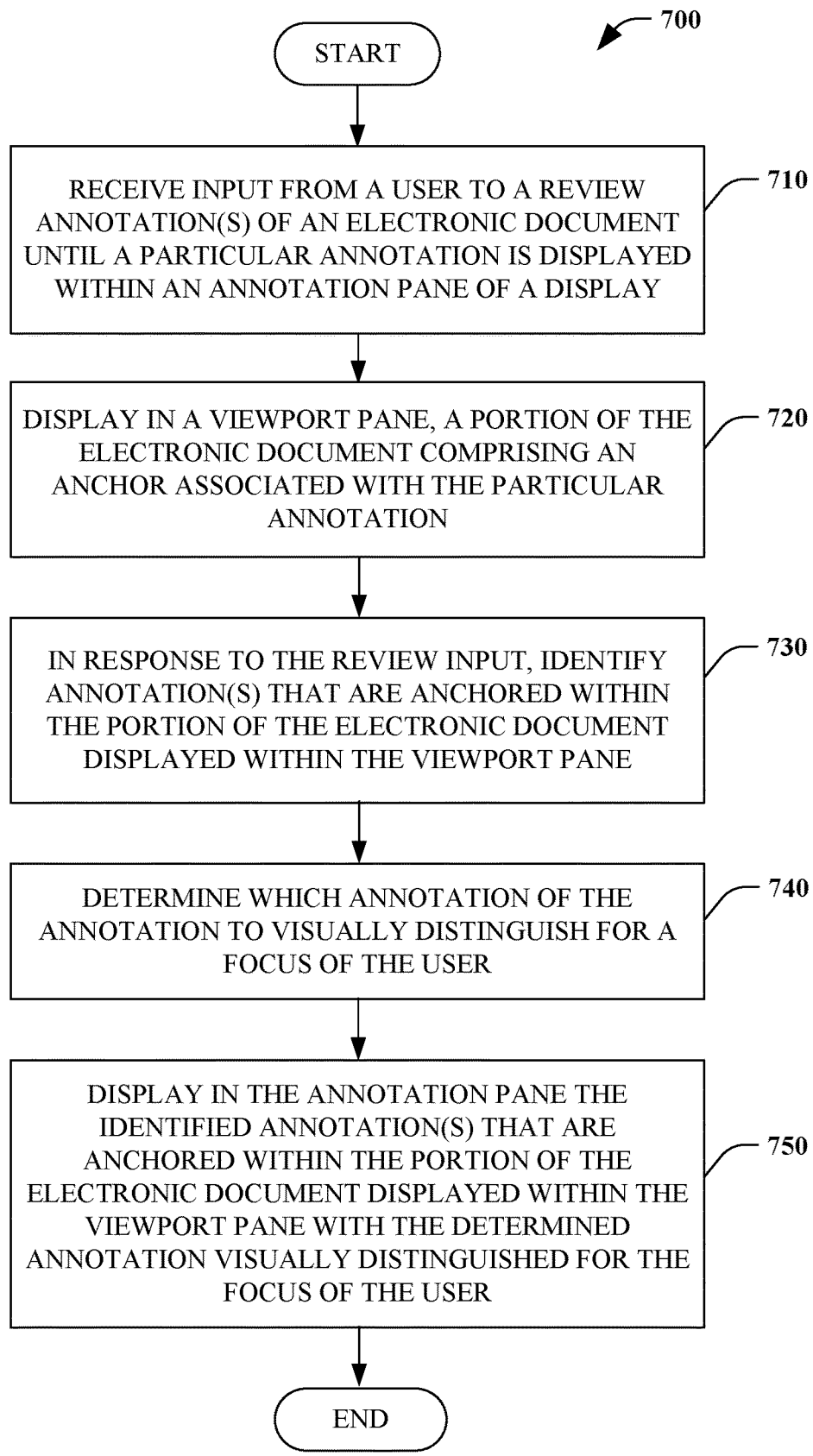
FIG. 7 is a flow chart that illustrates another method of displaying one or more annotations of an electronic document.

FIGS. 6 and 7 illustrate exemplary methodologies relating to displaying one or more annotations of an electronic document. While the methodology is shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 6, a method of displaying one or more annotations of an electronic document 600 is illustrated. In some embodiments, the method 600 is performed by the system 100.

At 610, input to review (e.g., open, scroll) an electronic document is received from a user, until a selected portion of the electronic document is displayed within a viewport pane of a display. At 620, in response to the review input, one or more annotations that are anchored within the selected portion of the electronic document displayed within the viewport are identified. In some embodiments, each annotation comprises one or more comments of a comment thread (e.g., a particular comment thread).

At 630, which annotation of the one or more annotations to visually distinguish for a focus of the user is determined. At 640, the identified one or more annotations that are anchored within the selected portion of the electronic document displayed within the viewport are displayed in an annotation pane, with the determined annotation visually distinguished for the focus of the user. In some embodiments, a hint is provided for each line having anchor(s) of the electronic document displayed within the viewport.

Turning to FIG. 7, a method of displaying one or more annotations of an electronic document 700 is illustrated. In some embodiments, the method 700 is performed by the system 100.

At 710, input is received from a user to review (e.g., scroll) annotations of an electronic document until a particular annotation is displayed within an annotation pane of a display. In some embodiments, as part of the review input, the user can select (e.g., click) the particular annotation. At 720, in response to the review input, a portion of the electronic document comprising an anchor associated with the particular annotation is displayed in a viewport pane.

At 730, in response to the review input, annotation(s) that are anchored within the portion of the electronic document displayed within the viewport pane are identified. At 740, which annotation of the one or more annotations to visually distinguish for a focus of the user is determined.

At 750, the identified one or more annotations that are anchored within the selected portion of the electronic document displayed within the viewport are displayed in an annotation pane, with the determined annotation visually distinguished for the focus of the user. In some embodiments, a hint is provided for each line having anchor(s) of the electronic document displayed within the viewport.

Described herein is a system for displaying one or more annotations of an electronic document, comprising: a computer comprising a processor and a memory having computer-executable instructions stored thereupon which, when executed by the processor, cause the computer to: receive input from a user to review an electronic document until a selected portion of the electronic document is displayed within a viewport pane of a display; in response to the review input, identify one or more annotations that are anchored within the selected portion of the electronic document displayed within the viewport pane; determine which annotation of the one or more annotations to visually distinguish for a focus of the user; and display in an annotation pane the identified one or more annotations that are anchored within the selected portion of the electronic document displayed within the viewport pane with the determined annotation visually distinguished for the focus of the user.

The system can further include wherein each annotation comprises one or more comments of a particular comment thread. The system can further include wherein the determined annotation and an anchor associated with the determined annotation are visually distinguished to provide a contextual link to a user. The system can further include wherein determine which annotation of the one or more annotations to visually distinguish for the focus of the user is based upon at least one of a first anchor in a flow of text of the electronic document displayed within the viewport pane or a top anchor of content of the electronic document displayed within the viewport pane.

The system can further include wherein determine which annotation of the one or more annotations to visually distinguish for the focus of the user is based upon a most recently modified annotation. The system can further include wherein determine which annotation of the one or more annotations to visually distinguish for the focus of the user is based upon a machine learning algorithm. The system can further include wherein only the determined annotation and an anchor associated with the determined annotation are visually distinguished.

The system can further include wherein a plurality of annotations is determined to be visually distinguished with each of the determined annotations and an anchor associated with the particular annotation highlighted in a same particular color with each of the determined annotations highlighted in a different color. The system can further include wherein the anchor comprises at least one of a point, an alphanumeric character, a word, a sentence, a paragraph, a section, digital ink, an image, a table, a cell, a chart, an embedded object, or an entirety of the electronic document. The system can further include wherein the annotation pane is separately scrollable from the viewport pane with the viewport pane updated in accordance with annotation(s) displayed in the annotation pane.

The system can further include the memory having further computer-executable instructions stored thereupon which, when executed by the processor, cause the computer to: receive input from the user to review annotations within the annotation pane until a particular annotation is displayed within the annotation pane; and in response to user input to review annotations, displaying, in the viewport pane, a portion of the electronic document comprising an anchor associated with the particular annotation.

Described herein is a method of displaying one or more annotations of an electronic document, comprising: receiving input from a user to review an electronic document until a selected portion of the electronic document is displayed within a viewport pane of a display; in response to the review input, identifying one or more annotations that are anchored within the selected portion of the electronic document displayed within the viewport pane; determining which annotation of the one or more annotations to visually distinguish for a focus of the user; and displaying in an annotation pane the identified one or more annotations that are anchored within the selected portion of the electronic document displayed within the viewport pane with the determined annotation visually distinguished for the focus of the user.

The method can further include displaying one or more hints which provide a visual signal to the user that one or more annotations are associated with an anchor on a particular line of the electronic document. The method can further include wherein the determined annotation and an anchor associated with the determined annotation are visually distinguished to provide a contextual link to a user.

The method can further include wherein determine which annotation of the one or more annotations to visually distinguish for the focus of the user is based upon a first anchor in a flow of text of the electronic document displayed within the viewport pane. The method can further include wherein determine which annotation of the one or more annotations to visually distinguish for the focus of the user is based upon a most recently modified annotation. The method can further include wherein determine which annotation of the one or more annotations to visually distinguish for the focus of the user is based upon a machine learning algorithm.

Described herein is a computer storage media storing computer-readable instructions that when executed cause a computing device to: receive input from a user to review an electronic document until a selected portion of the electronic document is displayed within a viewport pane of a display; in response to the review input, identify one or more annotations that are anchored within the selected portion of the electronic document displayed within the viewport pane; determine which annotation of the one or more annotations to visually distinguish for a focus of the user; and display in an annotation pane the identified one or more annotations that are anchored within the selected portion of the electronic document displayed within the viewport pane with the determined annotation visually distinguished for the focus of the user.

The computer storage media can further include wherein the determined annotation and an anchor associated with the determined annotation are visually distinguished to provide a contextual link to a user. The computer storage media can further include wherein determine which annotation of the one or more annotations to visually distinguish for the focus of the user is based upon a first anchor in a flow of text of the electronic document displayed within the viewport pane.

Figure 8:
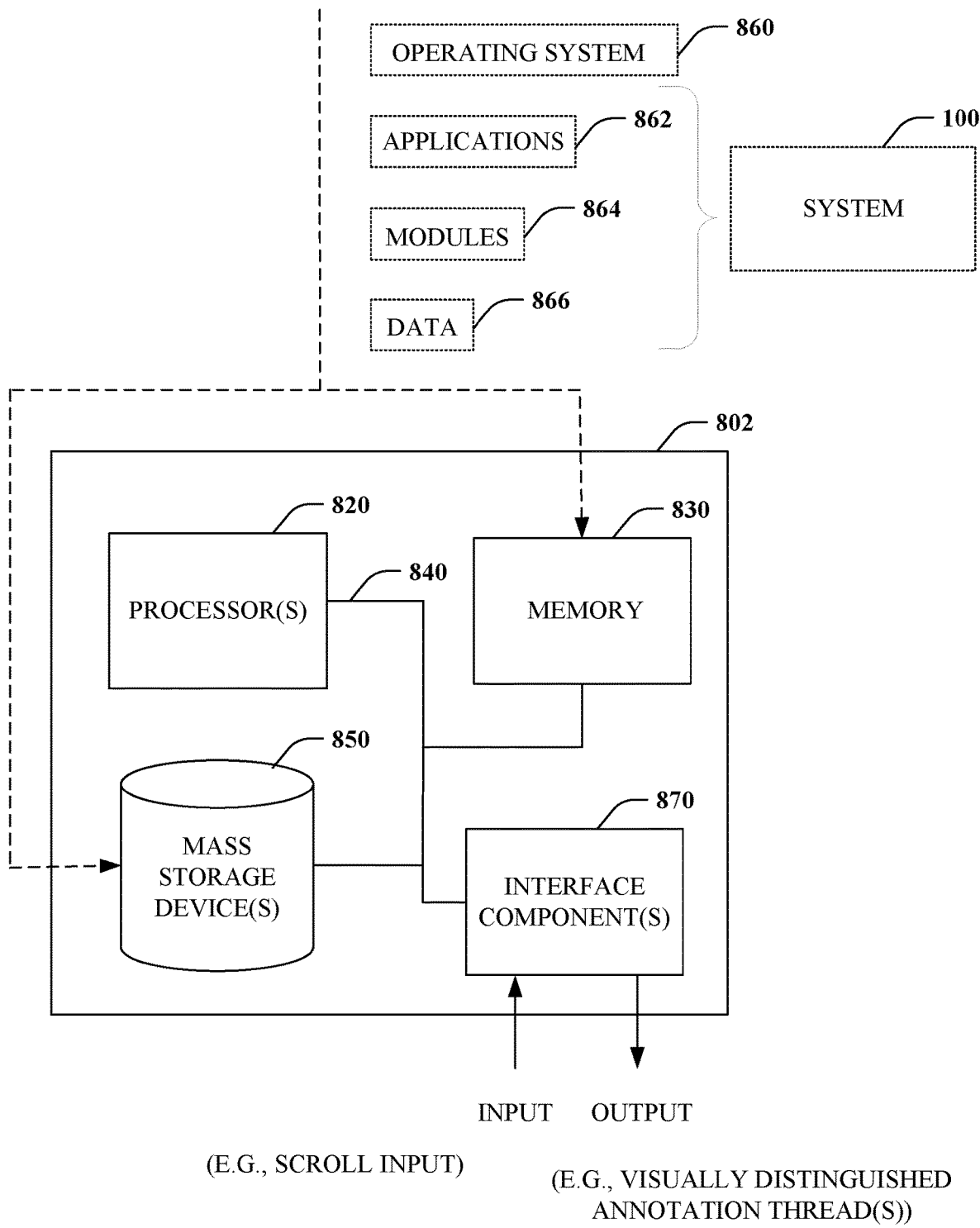
FIG. 8 is a functional block diagram that illustrates an exemplary computing system.

With reference to FIG. 8, illustrated is an example general-purpose computer or computing device 802 (e.g., mobile phone, desktop, laptop, tablet, watch, server, handheld, programmable consumer or industrial electronics, set-top box, game system, compute node, etc.). For instance, the computing device 802 may be used in a system displaying one or more annotations of an electronic document 100.

The computer 802 includes one or more processor(s) 820, memory 830, system bus 840, mass storage device(s) 850, and one or more interface components 870. The system bus 840 communicatively couples at least the above system constituents. However, it is to be appreciated that in its simplest form the computer 802 can include one or more processors 820 coupled to memory 830 that execute various computer executable actions, instructions, and or components stored in memory 830. The instructions may be, for instance, instructions for implementing functionality described as being carried out by one or more components discussed above or instructions for implementing one or more of the methods described above.

The processor(s) 820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 820 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 820 can be a graphics processor.

The computer 802 can include or otherwise interact with a variety of computer-readable media to facilitate control of the computer 802 to implement one or more aspects of the claimed subject matter. The computer-readable media can be any available media that can be accessed by the computer 802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 830 and mass storage device(s) 850 are examples of computer-readable storage media. Depending on the exact configuration and type of computing device, memory 830 may be volatile (e.g., RAM), non-volatile (e.g., ROM, flash memory, etc.) or some combination of the two. By way of example, the basic input/output system (BIOS), including basic routines to transfer information between elements within the computer 802, such as during start-up, can be stored in nonvolatile memory, while volatile memory can act as external cache memory to facilitate processing by the processor(s) 820, among other things.

Mass storage device(s) 850 includes removable/non-removable, volatile/non-volatile computer storage media for storage of large amounts of data relative to the memory 830. For example, mass storage device(s) 850 includes, but is not limited to, one or more devices such as a magnetic or optical disk drive, floppy disk drive, flash memory, solid-state drive, or memory stick.

Memory 830 and mass storage device(s) 850 can include, or have stored therein, operating system 860, one or more applications 862, one or more program modules 864, and data 866. The operating system 860 acts to control and allocate resources of the computer 802. Applications 862 include one or both of system and application software and can exploit management of resources by the operating system 860 through program modules 864 and data 866 stored in memory 830 and/or mass storage device (s) 850 to perform one or more actions. Accordingly, applications 862 can turn a general-purpose computer 802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 862, and include one or more modules 864 and data 866 stored in memory and/or mass storage device(s) 850 whose functionality can be realized when executed by one or more processor(s) 820.

In accordance with one particular embodiment, the processor(s) 820 can correspond to a system on a chip (SOC) or like architecture including, or in other words integrating, both hardware and software on a single integrated circuit substrate. Here, the processor(s) 820 can include one or more processors as well as memory at least similar to processor(s) 820 and memory 830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 802 also includes one or more interface components 870 that are communicatively coupled to the system bus 840 and facilitate interaction with the computer 802. By way of example, the interface component 870 can be a port (e.g., serial, parallel, PCMCIA, USB, FireWire, etc.) or an interface card (e.g., sound, video, etc.) or the like. In one example implementation, the interface component 870 can be embodied as a user input/output interface to enable a user to enter commands and information into the computer 802, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 870 can be embodied as an output peripheral interface to supply output to displays (e.g., LCD, LED, plasma, etc.), speakers, printers, and/or other computers, among other things. Still further yet, the interface component 870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
    a processor; and
    a memory having computer-executable instructions stored thereupon which, when executed by the processor, cause the system to:
        receive a first scroll input from a user to review an electronic document until a selected portion of the electronic document is displayed within a viewport pane of a display;
        in response to the first scroll input:
            identify annotations having associated anchors within the selected portion of the electronic document displayed within the viewport pane;
            automatically determine a significant annotation selected from the annotations;
            display the annotations in an annotation pane; and
            visually distinguish the significant annotation from other annotations by highlighting the significant annotation and a particular anchor associated with the significant annotation using a same particular color that is different from colors used to highlight the other annotations and other anchors;

receive a second scroll input from the user to review the annotation pane until a particular annotation is displayed within the annotation pane; and in response to the second scroll input:
identify a particular associated anchor associated with the particular annotation displayed within the annotation pane; and display an associated portion of the electronic document that includes the particular associated anchor in the viewport pane.

2. The system of claim 1, wherein each annotation comprises one or more comments of a particular comment thread.

3. The system of claim 1, wherein the significant annotation and the particular anchor associated with the significant annotation are highlighted using the same particular color to provide a contextual link to the user.

4. The system of claim 1, wherein only the significant annotation and the particular anchor associated with the significant annotation are visually distinguished.

5. The system of claim 1, wherein one or more annotations are determined to be visually distinguished in addition to the significant annotation, and the one or more annotations that are determined to be visually distinguished are each highlighted in a different color.

6. The system of claim 1, wherein the associated anchors comprise at least one of a point, an alphanumeric character, a word, a sentence, a paragraph, a section, digital ink, an image, a table, a cell, a chart, an embedded object, or an entirety of the electronic document.

7. The system of claim 1, wherein the significant annotation is automatically determined based at least on most recently modified times of the annotations.

8. The system of claim 1, wherein the significant annotation is automatically determined based at least on an association between the user and the significant annotation.

9. The system of claim 1, wherein the significant annotation is automatically determined based at least on locations of the associated anchors within the viewport pane.

10. A method, comprising:
receiving a first scroll input from a user to review an electronic document until a selected portion of the electronic document is displayed within a viewport pane of a display;

in response to the first scroll input:
identifying annotations having associated anchors within the selected portion of the electronic document displayed within the viewport pane;

automatically determining a significant annotation selected from the annotations;

displaying the annotations in an annotation pane; and visually distinguishing the significant annotation from other annotations by highlighting the significant annotation and a particular anchor associated with the significant annotation using a same particular color that is different from colors used to highlight the other annotations and other anchors;

receiving a second scroll input from the user to review the annotation pane until a particular annotation is displayed within the annotation pane; and in response to the second scroll input:
identifying a particular associated anchor associated with the particular annotation displayed within the annotation pane; and displaying an associated portion of the electronic document that includes the particular associated anchor in the viewport pane.

11. The method of claim 10, displaying one or more hints which provide a visual signal to the user that one or more annotations are associated with an anchor on a particular line of the electronic document.

12. The method of claim 10, wherein the significant annotation and the particular anchor associated with the significant annotation are visually distinguished to provide a contextual link to the user.

13. The method of claim 10, wherein the significant annotation is automatically determined based at least on most recently modified times of the annotations.

14. The method of claim 10, wherein the significant annotation is automatically determined based at least on an association between the user and the significant annotation.

15. The method of claim 10, wherein the significant annotation is automatically determined based at least on locations of the associated anchors within the viewport pane.

16. A computer storage media storing computer-readable instructions that, when executed, cause a computing device to:
receive a first scroll input from a user to review an electronic document until a selected portion of the electronic document is displayed within a viewport pane of a display;

in response to the first scroll input:
identify annotations having associated anchors within the selected portion of the electronic document displayed within the viewport pane;

automatically determine a significant annotation selected from the annotations by accessing a model that has been trained to identify significant annotations using a machine learning algorithm;

display the annotations in an annotation pane; and visually distinguish the significant annotation from other annotations by highlighting the significant annotation and a particular anchor associated with the significant annotation using a same particular color that is different from colors used to highlight the other annotations and other anchors;

receive a second scroll input from the user to review the annotation pane until a particular annotation is displayed within the annotation pane; and in response to the second scroll input:
identify a particular associated anchor associated with the particular annotation displayed within the annotation pane; and display an associated portion of the electronic document that includes the particular associated anchor in the viewport pane.

17. The computer storage media of claim 16, wherein the significant annotation and the particular anchor associated with the significant annotation are highlighted using the same particular color to provide a contextual link to the user.

18. The computer storage media of claim 16, wherein the significant annotation is automatically determined based at least on most recently modified times of the annotations.

19. The computer storage media of claim 16, wherein the significant annotation is automatically determined further based at least on an association between the user and the significant annotation.

20. The computer storage media of claim 16, wherein the computer-readable instructions further cause the computing device to:

automatically determine more than one significant annotations selected from the annotations; and visually distinguish the more than one significant annotations from the other annotations by highlighting the more than one significant annotations and more than one anchors associated with the more than one significant annotations using the same particular color.

\* \* \* \* \*